United States Patent [19]
Lohmeijer et al.

[11] Patent Number: 5,741,846
[45] Date of Patent: Apr. 21, 1998

[54] THERMOPLASTIC COMPOSITION COMPRISING A COMPATIBILIZER POLYPHENYLENE ETHER POLYAMIDE BASE RESIN AND ELECTROCONDUCTIVE CARBON BLACK

[75] Inventors: Johannes Hubertus Gabriél Marie Lohmeijer, Hoogerheide; Johannes Everardus Fortuijn; Jan Wagenaar, both of Bergen op Zoom, all of Netherlands

[73] Assignee: General Electric Company, Pittsfield, Mass.

[21] Appl. No.: 617,535

[22] Filed: Mar. 15, 1996

Related U.S. Application Data

[63] Continuation of Ser. No. 349,850, Dec. 6, 1994, abandoned.

[30] Foreign Application Priority Data

Jun. 1, 1994 [EP] European Pat. Off. ............ 94108412

[51] Int. Cl.$^6$ .................................................. C07K 3/16
[52] U.S. Cl. .......................... 524/538; 524/540; 525/397; 252/511
[58] Field of Search ............................ 524/538, 540; 525/397; 252/511

[56] References Cited

U.S. PATENT DOCUMENTS

| | | | |
|---|---|---|---|
| 3,257,357 | 6/1966 | Stamatoff | 528/215 |
| 3,257,358 | 6/1966 | Stamatoff | 528/212 |
| 3,306,874 | 2/1967 | Hay | 528/215 |
| 3,306,875 | 2/1967 | Hay | 528/215 |
| 4,329,276 | 5/1982 | Reardon | 524/502 |
| 4,329,278 | 5/1982 | Reardon | 524/523 |
| 4,388,607 | 6/1983 | Toy et al. | 338/225 D |
| 4,391,741 | 7/1983 | Masamoto et al. | 252/511 |
| 4,929,388 | 5/1990 | Wessling | 252/500 |
| 5,143,650 | 9/1992 | Gerace et al. | 524/496 |
| 5,223,106 | 6/1993 | Gerace et al. | 204/181.1 |
| 5,250,226 | 10/1993 | Oswal et al. | 252/500 |
| 5,256,574 | 10/1993 | Neuburger et al. | 436/143 |
| 5,322,874 | 6/1994 | Fujii et al. | 524/495 |
| 5,334,636 | 8/1994 | Fujii et al. | 525/68 |

FOREIGN PATENT DOCUMENTS 0506386  9/1992  European Pat. Off. .

*Primary Examiner*—Frederick Krass

[57] ABSTRACT

The present invention deals with a thermoplastic composition comprising (a) a compatibilized polyphenylene ether-polyamide base resin, and (b) 1–7 parts by weight per 100 parts by weight of (a) of an electroconductive carbon black, with an Izod notched impact strength of more than 15 kJ/m$^2$ and a volume resistivity of less than $10^6$ Ohm·cm.

15 Claims, No Drawings

THERMOPLASTIC COMPOSITION COMPRISING A COMPATIBILIZER POLYPHENYLENE ETHER POLYAMIDE BASE RESIN AND ELECTROCONDUCTIVE CARBON BLACK

This is a continuation of application Ser. No. 08/349,850 filed on Dec. 6, 1994, now abandoned.

BACKGROUND OF THE INVENTION

1. Field of the Invention

The invention relates to thermoplastic compositions comprising (a) a compatibilized polyphenylene ether-polyamide base resin, and (b) 1–7 parts by weight per 100 parts by weight of (a) of an electroconductive carbon black, wherein the composition has an Izod notched impact strength of more than 15 kJ/m$^2$ (measured in accordance with ISO 180/1A) and a volume resistivity of less than 10$^6$ Ohm·cm (measured on the narrow parallel portion of multipurpose test specimen type A according to ISO 3167 with a length of about 70 mm obtained by breaking off both ends of the test specimen, molded as described in ISO 294 for dumb-bell bars, the fracture surface of both ends being coated with a silver paint and the resisitivity being measured between the silver painted surfaces with an electrical multimeter).

More preferably the compositions of the invention have a volume resistivity of less than 5·10$^5$ Ohm·cm, most preferred of between 5·10$^3$ and 5·10$^5$ Ohm·cm. The concentration of electroconductive carbon black is preferably between 2 and 5 parts by weight.

The thermoplastic compositions may further comprise additional additives.

The invention also relates to articles formed out of the compositions of the invention.

The invention further relates to a process for the manufacture of the thermoplastic compositions according to the invention; to a process for coating objects electrostatically and for the electrostatically coated objects so obtained.

2. Description of the Related Art

The incorporation of electroconductive carbon blacks in thermoplastic compositions is generally known. Electroconductive carbon blacks may be added to give objects made out thermoplastic compositions antistatic properties or even electroconductive properties. Usually they are added to change the surface resistivity of such objects only.

JP-A-92-165 939 describes blends of 100 parts of a thermoplastic resin, which can be a polyphenylene, to which have been added 0.01–5 parts of a polyamide and 0.1–30 parts electroconductive carbon black. The blends have an Izod impact strength of 4.0 kg·cm/cm and have a low SO$_2$ generation.

The incorporation of electroconductive carbon blacks in thermoplastic composition usually results in lowering the mechanical properties like strength, in particular the impact strength. Upon increasing the content of electroconductive carbon black as may be required to obtained the desired surface resistivity the mechanical properties usually deteriorate further.

SUMMARY OF THE INVENTION

It has now been found that in compatibilized polyphenylene ether-polyamide base resin compositions it is possible to obtain the desired resistivity values at lower electroconductive carbon black concentrations by following a special process for the preparation of such compositions.

The process results in new compositions having a unique combination of properties: good impact strength, good flow and good (low) resistivity values.

The new process of the invention for the manufacture of the thermoplastic compositions of the invention comprises at least the following two steps in the indicated order:

1. manufacture of a compatibilized polyphenylene ether-polyamide base resin and
2. incorporation of the electroconductive carbon black in the compatibilized polyphenylene ether-polyamide base resin.

The process of the invention makes it possible to obtain the claimed compositions. In addition the process has the advantage that it is possible to obtain a more consistent production process i.e. the properties of the prepared composition in particular the volume resistivity hardly varies over time when all processing conditions remain the same. Other known processes for the preparation of blends with the same overall composition result in products with quite different volume resistivity.

In the second step of the above indicated process the electroconductive carbonblack is preferably incorporated into the polyphenylene ether polyamide base resin after the base resin has been brought into a hot molten state of at least 300 degrees Centigrade.

The electroconductive black can be added as such or in the form of a master batch comprising a polymer and the electroconductive carbon black.

The two essential steps of the claimed process of the invention can be performed very well by means of two compounding steps, for example two extrusion steps. Said two extrusion steps can be combined in one extruder with a side stream supply.

It is one object of the invention to provide polyphenylene ether-polyamide compatibilized base resin compositions comprising electroconductive carbon blacks, which are suitable for making objects thereof by conventional molding processes, which objects can be easily coated by common electrostatic coating processes.

It has been found that the suitability for electrostatic coating is more directly related with the volume resistivity of the composition than with the surface resistivity. The surface resistivity may vary for compositions which are equally well suitable for electrostatic coating processes.

It is therefore preferred in the invented process for the manufacture of the compositions of the invention to monitor the suitability of the manufactured compositions for electrostatic coating by measuring the volume resistivity.

Similarly in the process of electrostatically coating objects made out of the composition of the invention it is preferred to coat objects made out of a composition with a predetermined volume resistivity, preferably of between 5·10$^3$ and 5·10$^5$ Ohm·cm.

DESCRIPTION OF THE PREFERRED EMBODIMENTS

The thermoplastic compositions of the invention comprise at least the following two constituents:

A) a compatibilized polyphenylene ether-polyamide base resin and

B) an electroconductive carbon black in the quantity as indicated in the claims.

The compatibilized component and the composition may further comprise usual additives, like agents to improve the impact strength, reinforcing fibers, stabilizers, dyes, pigments, polyolefines, lubricants.

A. Compatibilized polyphenylene ether-polyamide base resin.

The compatibilized polyphenylene ether-polyamide base resin comprises a polyphenylene ether ($a_1$) and a polyamide ($a_2$). The preferred quantities are 10 to 90 weight percent polyphenylene ether ($a_1$) and 90 to 10 weight percent polyamide ($a_2$), based upon the weight of ($a_1$) and ($a_2$) together. More preferred the polyamide constitutes the continuous phase and is present in a quantity of greater than 35 weight percent of the compatibilized base resin (A).

Preferred polyphenylene ether resins (PPE) and polyamide resins as well as means for providing compatibilized combinations thereof are described below.

In general it is desirable that the polyamide component comprises a continuous phase in the overall composition and, therefore, typically at least 35 percent by weight of the total PPE-polyamide-composition will be comprised of the polyamide component.

Polyphenylene ethers are a well known class of compounds sometimes referred to as polyphenylene oxides. Examples of suitable polyphenylene ethers and processes for their preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

A particularly useful PPE would be poly(2,6-dimethyl-1,4-phenylene ether) having an intrinsic viscosity (I.V.) greater than approximately 0.10 dl/g as measured in chloroform at 25° C. The I.V. will typically be between 0.25 and 0.6 dl/g.

The polyamide resins useful in the practice of the present invention are a generic family of resins known as nylons, characterized by the presence of an amide group (—CONH—). Nylon-6 and nylon-6,6 are the generally preferred polyamides and are available from a variety of commercial sources. Other polyamides, however, such as nylon-4, nylon-12, nylon-6,10, nylon 6,9 or others such as the amorphous nylons may be useful for particular polyphenylene ether-polyamide applications.

The polyamides can be provided by a number of well known processes. Nylon-6, for example, is a polymerization product of caprolactam. Nylon-6,6 is a condensation product of adipic acid and hexamethylenediamine. A nylon-6,6 having an average molecular weight of approximately 10,000 is especially preferred for many useful polyphenylene ether-polyamide thermoplastic applications. Preferred polyamides will typically have a relative viscosity of at least 35, in accordance with ASTM Test Method D789.

In preferred embodiments of the present invention, a compatibilizing agent may be employed in the preparation of the composition. The two-fold purpose for using compatibilizing agents is to improve, in general, the physical properties of the polyphenylene ether-polyamide resin, as well as to enable the use of a greater proportion of the polyamide component. When used herein, the expression "compatibilizing agent" refers to those polyfunctional compounds which interact with either the polyphenylene ether, the polyamide, or both. This interaction may be chemical (e.g. grafting) or physical (e.g. affecting the surface characteristics of the dispersed phases). In either instance the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatibitible without such agents, as taught in U.S. Pat. No. 3,379,792.

Examples of the various compatibilizing agents that may be employed in the practice of the present invention include: a) liquid diene polymers, b) epoxy compounds, c) oxidized polyolefin wax, d) quinones, e) organosilane compounds and f) polyfunctional compounds as described hereinafter.

Liquid diene polymers (a) suitable for use herein include homopolymers of a conjugated diene with at least one monomer selected from the group consisting of other conjugated dienes; vinyl monomer, e.g. styrene and alpha-methyl styrene; olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699 and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene) and the like.

Epoxy compounds (b) suitable for use in the practice of the present invention include: (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin, (3) glycidyletherified products of monohydric alcohols and monohydric phenols including phenyl glycidylether, butyl glycidyl ether and cresyl glycidylether; (4) glycidyl derivates of animo compounds for example, the diglycidyl derivate of aniline, and (5) epoxidized products of higher olefinic or cycloalkene, or natural unsaturated oils (e.g. soybean) as well as of the foregoing liquid diene polymers.

Oxidized polyolefin waxes (c) are well known and a description thereof and processes for the production of the same are found in U.S. Pat. Nos. 3,822,227 and 3,756,999 and German Patent Publications 3,047,915 and 2,201,862.

Generally, these are prepared by an oxidaton or suspension oxidation of polyolefin. An especially preferred polyolefin wax is "Hoechst Wachs".

Quinone compounds (d) suitable for use herein are characterized as having in the molecule of the unsubstituted derivative at least one 6 membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bounds and carbonyl carbon-carbon double bonds in the ring structure, said carbon-carbon double bonds and carbonyl carbon-oxygen double bonds being conjugated with respect to each other. Where more than one ring is present in the unsubstituted quinone, the rings may be fused, non-fused or both: non-fused rings may be bound by a direct carbon-carbon double bond or by a hydrocarbon radical having conjugated unsaturation such as =C—C=.

Substituted quinones are also within the scope of the present invention. The degree of substitution; where substitution is desired, may be from one to the maximum number of replaceable hydrogen atoms. Examplary of the various substituents that may be present on the unsubstituted quinone structures include halogen. e.g. chlorine. bromine. flourine, etc. hydrocarbon radicals including branched and unbranched, saturated and unsaturated alkyl, aryl, alkyl aryl and cycloalkyl radicals and halogenated derivatives thereof; and similar hydrocarbons having hetero atoms therein, particularly oxygen, sulfur or phosphorous and wherein the same connects the radical to the quinone ring (e.g. oxygen link).

As examples of the various quinones there may be mentioned 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro-1,4-benzoquinone; 2,6-dimethyl benzoquinone and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from the group consisting of an amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present, being linked through an oxygen link (e.g. siloxanes), a silicon bond; or a bifunctional organic radical (e.g. methylene or phenylene groups).

Examples of suitable organosilane compounds include: gamma amino propyltriethoxy silane, 2-(3-cyclohexanyl) ethyl trimethoxy silane; 1,3-divinyl tetraethoxy silane; vinyl tris-(2-methoxyethoxy)silane; 5-bicycloheptenyl triethoxy silane and gamma mercapto propyl trimethoxy silane.

Polyfunctional compounds (f) which may be employed as compatibilizer in the practice of the present invention are of three types. The first type of polyfunctional compounds are those having in the molecule both (a) a carbon-carbon double bond or a carbon-carbon triple bond and (b) at least one carboxylic acid, acid anhydride, acid halide, anhydride, acid halide anhydride, acid amide, acid ester, imide, amino, or hydroxy group. Examples of such polyfunctional compounds include maleic acid; maleic anhydride; fumaric acid; citraconic acid; itatonic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups; and functionalized diene polymers and copolymers. Of these, one of the preferred compatibilizing agents for compositions of the present invention is maleic anhydride. It is possible to prereact this type of compatibilizers with the polyphenylene ethers of the compositions.

The second group of polyfunctional compatibilizer compounds suitable for use herein are charaterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the aliphatic polycarboxylic acids, acid esters and acid amides represented by the formula:

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein (OR') is alpha or beta to a carbonyl group and at least two carbonyl groups are seperated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids there may be given citric acid, malic acid, and agaricic acid; including the various commercial forms thereof, such as for example, the anhydrous and hydrated acids. Of these, citric acid is another of the preferred compatibilizing agents. Illustrative of acid esters useful herein include for example, acetyl citrate and mono- and/or di-stearyl citrates and the like. Suitable acid amides useful herein include for example N,N'-diethyl citric acid amide; N-phenyl citric acid amide; N-dodecyl citric acid amide; N,N'-didodecyl citric acid amide and N-dodecyl malic acid present invention. Especially preferred derivates are the salts thereof, including the salts with amines and/preferably, the alkali and alkaline metal salts. Examplary of suitable salts include calcium malate, calcium citrate, potassium malate and potassium citrate.

The third group of polyfuntional compatibilizer compounds suitable for use herein are characterized as having in the molecule both (a) an acid halide group, most preferably an acid chloride group and (b) at least one carboxylic acid, carboxylic acid anhydride, acid ester or acid amide group, preferably a carboxylic acid or carboxylic acid anhydride group. Exemplary of compatibilizers within this group there may be given trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride and chloroacetyl glutaric acid. Among these, trimellitic anhydride acid chloride is preferred. Furthermore, it is especially preferred that compatibilizers of this group be prereacted with at least a portion of the polyphenylene ether whereby the compatibilizing agent is a PPE-functionalized compound.

Each of the foregoing compatibilizing agents are more fully described in U.S. Pat. Nos. 4,315,086 and 4,642,358; and European Patent Application No. 04640.

The foregoing compatibilizing agents may be used alone or in any combination of one another. Furthermore, they may be added directly to the melt blend or precompounded with either or both the polyphenylene ether and polyamide as well as with other resinous materials employed in the preparation of the compositions of the present invention. With many of the foregoing compatibilizing agents, particularly the polyfunctional compounds, even greater improvement in compatibility is found where at least a portion of the compatibilizing agent is precompounded with all or part of the polyphenylene ether. It is believed that such precompounding may cause the compatibilizing agent to react with the polymer and, consequently, functionalize that polymer as noted above for example, the polyphenylene oxide may be precompounded with trimellitic anhydride acid chloride to form an anhydride functionalized polyphenylene ether which has improved compatibility with the polyamide compared to a non-functionalized ether.

Where the compatibilizing agent is employed in the preparation of the compositions of the present invention, the initial amount used will be dependent upon the specific compatibilizing agent chosen and the specific polymeric system to which is added.

It is possible to use in the composition according to the invention any other known compatibilisation system. Other systems have been described for example in U.S. Pat. No. 4,866,114.

Where chemical resistance is a desirable property of the thermoplastic resin, it will ordinarily be necessary that the polyamide resin form a continuous phase of the resin composition. Therefore, to avoid a phase inversion whereby the polyamide phase is discontinuous, the preferred compositions of the present invention will be comprised of a polyamide resin in an amount equal to or greater than approximately 35 percent by weight of the total base resin composition.

It is possible to incorporate in the composition according to the invention one or more impact modifiers. All impact modifiers as generally used for compositions comprising a polyphenylene ether, a polyamide or a combination of a polyphenylene ether and a polyamide can be used. Particularly suitable are the socalled blockcopolymers, like triblock copolymers and diblockcopolymers.

A variety of useful polyphenylene ether-polyamide compositions can be provided which include varying amount of the impact modifier. Typically, improved properties, especially regarding the ductile behavior of the plastic, will be noted when 1 to 30 parts by weight of an impact modifier are utilized per 100 parts of the polyphenylene ether and polyamide components taken together.

The diblock or triblock copolymer rubber additive which may be used in compositions of the present invention is a thermoplastic rubber comprised of one or two alkenyl aromatic blocks which are typically styrene blocks and a rubber block e.g. a butadiene block which may be partially hydrogenated.

The thermoplastic composition of the invention may comprise fillers like glass fibers or talc.

The polymer composition according to the invention may further comprise at least one flame retardant agent.

All patents and patent applications mentioned above are incorporated herein by reference.

The invention will be further illustrated by the following examples.

EXAMPLES

Preparation of Compatibilized Polyphenylene Ether Polyamide Blend

A polyphenylene ether derived from 2,6-dimethyl phenol with an intrinsic viscosity of 40 ml/g (as measured in chloroform at 25° C.) and citric acid were introduced together with two impact modifiers and stabilizers at the throat of a WP 28 compounder with a co-rotating twin screw; downstream in the compounder a polyamide 6,6 with a viscosity number of 148 ml/g (measured according to ISO 307 in sulphuric acid) was added. The compounding conditions were such that an average temperature of 310° C. was maintained.

The overall composition of this blend was about 36% by weight of the polyphenylene ether, about 0.7% by weight citric acid and about 48% by weight of polyamide 6,6, about 8% by weight of a first blockcopolymer a diblock copolymer with a saturated olefin rubber, being ethylene/propylene, as elastomeric block and a thermoplastic polymer, being styrene, as second block and about 7% by weight of a second block copolymer a triblock copolymer with a saturated olefin rubber, being ethylene/butylene, as elastomeric midblock and a thermoplastic polymer, being styrene, as other blocks and 0.06 inorganic iodine stabilizers.

Comparative Experiments 1 and 2

In a first experiment a compatibilized polyphenylene ether-polyamide blend was prepared as described above. In a second experiment a comparable composition was prepared with about 3.5% by weight of an electroconductive carbon black (EC 600JD of AKZO). This composition was prepared in a similar way as described above with one difference: carbon black was added at the throat of the extruder together with the polyphenylene ether.

The obtained extrudates were pelletised. The melt viscosity (according to ISO 1133), the Izod notched impact strength (according to ISO 180/1A) and the Volume resistivity were determined of the compatibilized polyphenylene ether-polyamide resin blend with and without carbon black. All experiments were repeated several times under almost identical conditions.

The volume resistivity was determined on the narrow parallel portion of injection molded multipurpose test specimen according to ISO 3167. Said test specimen were molded as described in ISO 294 for dumb-bell bars with an injection molding machine (barrel temp. 280 degrees C.; mold temperature 80 degrees C.; at normal injection speed). Both ends of the test specimen were broken off so as to obtain a portion with a uniform cross section of 10×4 mm and a length of about 70 mm with a fractured surface at both ends. The fracture surface at both ends was coated with a silver paint and the volume resistivity was measured between both fractured surfaces with an electrical multimeter. The broken off specimen had a length of about 70 mm. It is essential that fractured surfaces and not surfaces obtained by cutting with a knife or sawing and the like are used.

The results were as follows (Table A):

TABLE A

| Properties | First Experiment Without electroconductive carbon black | Second Experiment with about 3.5% by weight electroconductive carbon black |
| --- | --- | --- |
| Izod notched impact (kJ/m$^2$) | 50 | 5 |
| Melt viscosity at 1500 s$^{-1}$, 282° C. (Pa·s) | 230 | 300 |
| Volume resistivity Ohm·cm. | $10^{13}$ or above | $10^5$–$10^9$* |

*variation found between ten batches run at practically identical extrusion conditions.

As can be seen the Izod notched impact strength drops considerably upon addition of 3.5% by weight of electroconductive carbon black. The melt viscosity increases to a value which is too high for a lot of applications. It is further difficult to obtain values for the volume resistivity in a consistent way.

Experiment in Accordance with the Invention (Fourth Experiment) and One Further Comparative Experiment (Third Experiment)

In a third experiment (comparative) an electroconductive carbon black was added in the compounder together with the polyamide. All other conditions and components were the same as in the first experiment.

In a fourth experiment (according to the invention) a composition was first prepared without any electroconductive carbon black in the way and with the composition as described for the first experiment. The so obtained composition was pelletized. The pellets were reintroduced in the compounder. During this second run through the compounder electroconductive carbon black was introduced through the downstream side feeder of the compounder at a point were the composition had reached a temperature of about 300 degrees Centigrade. All experiments were repeated several times under almost identical conditions.

The obtained results (together with the results of the previously described first experiment) are represented in the following table B.

TABLE B

| Properties | First Experiment Comparative Without electroconductive carbon black | Third Experiment Comparative 3.5% by weight electroconductive carbon black added dry | Fourth Experiment Invention 3.0% by weight electroconductive carbon black added in second extrusion step |
| --- | --- | --- | --- |
| Izod notched impact (kJ/m$^2$) | 50 | 15 | 20 |
| Melt viscosity at 1500 s$^{-1}$, 282° C. (Polyamide·s) | 230 | 300 | 250 |
| Volume resistivity Ohm·cm | $10^{13}$ or above | $10^6$–$10^9$* | $10^4$–$10^5$* |

*variation found between at least 15 batches run at practically identical extrusion conditions.

As can be seen from table B the impact strength of the composition of the invention (fourth experiment) is better than the impact strength of the compositions of the third experiment (comparative) with carbon black. In the composition of the invention the variation in volume resistivity from batch to batch was much smaller (for practical purposes negligible) as compared to the values found for the composition of the third experiment. In the fourth experiment the melt viscosity has a reasonable value, much better than the value of the third experiment.

It is further remarkable that with the process (of the invention) a product with a lower volume resistivity is obtained at an electroconductive carbon black concentration of 3.0% by weight lower than with the comparative process at 3.5% by weight electroconductive carbon black.

The third experiment was run at conditions only slightly different from the conditions of the fourth experiment. In the third experiment the carbon black was added before complete preparation of the compatibilized polyphenylene ether-polyamide blend. In the fourth experiment it was added after the preparation of this blend. This small difference resulted in different properties of the obtained blends as discussed above.

Electrostatic Painting

With the process of the invention several compositions were prepared with different values for the volume resistivity. This was possible by varying the concentration of the electroconductive black. Discs (101 mm diameter; 3.2 mm thickness) were molded out of the prepared compositions. The discs with one and the same volume resistivity may have varying surface values. Upon determination of the suitability of the discs for coating by convential electrostatic spray coating it was found that discs with one and the same volume resistivity were equally well suitable regardless of the surface resistivity. Similarly discs with about the same surface resistivity but with a different volume resistivity showed a different behaviour as to their suitability for electrostatic spray coating. With this finding it has bcome possible to control electrostatic spray coating better by controlling the volume resistivity rather than the surface resistivity.

We claim:

1. A thermoplastic composition comprising (a) a compatibilized polyphenylene ether-polyamide base resin, and (b) 1–7 parts by weight per 100 parts by weight of (a) an electroconductive carbon black, wherein the composition has a notched Izod impact strength of more than 15 kJ/m$^2$ (measured in accordance with ISO 180/1A) and a volume resistivity of less than $10^6$ Ohm-cm (measured on the narrow parallel portion of a multipurpose test specimen type A according to ISO 3167 with a length of about 70 mm obtained by breaking off both ends of the test specimen, molded as described in ISO 294 for dumb-bell bars, the fracture surface of both ends being coated with a silver paint and the resistivity being measured between the silver painted surfaces with an electrical multimeter) and wherein said electroconductive carbon black is added into said compatibilized polyphenylene ether-polyamide base resin.

2. A composition as in claim 1, wherein the composition has a volume resistivity of less than $5 \times 10^5$ Ohm·cm.

3. A composition as in claim 1, wherein the composition has a volume resistivity of between $5 \times 10^3$ and $5 \times 10^5$ Ohm·cm.

4. A composition as in claim 1, comprising 2–5 parts by weight of electroconductive carbon black per 100 parts by weight of (a).

5. A composition as in claim 1, wherein the composition has a melt viscosity of less than 260 Pa·s, as determined in accordance with ISO 1133 at 1500 s$^{-1}$ and 282° C.

6. A composition as in claim 1 wherein said compatibilized base resin (a) is comprised of ($a_1$) 10 to 90 weight percent polyphenylene ether resin and ($a_2$) 90 to 10 weight percent polyamide resin, based upon the weight of ($a_1$) and ($a_2$) together.

7. A composition as in claim 6 wherein said polyamide resin constitutes a continuous phase in an amount greater than 35 weight percent of the compatibilized base resin (a).

8. A composition as in claim 1 comprising a compatibilizing agent selected from the group consisting of: maleic anhydride, fumaric acid, citric acid, malic acid, reaction products of a polyphenylene ether and trimellitic anhydride acid chloride and reaction products of a polyphenylene ether and maleic anhydride or fumaric acid.

9. A composition as in claim 1 wherein said polyphenylene ether resin is a polymer or copolymer comprised of one or more units derived from compounds selected from the group consisting of 2,6-dimethyl phenol and 2,3,6-trimethyl phenol, and wherein said resin has an intrinsic viscosity of 0.25 to 0.6 dl/g as measured in chloroform at 25° C.

10. A composition as in claim 9 wherein said polyphenylene ether is poly(2,6-dimethyl-1,4-phenylene ether).

11. A composition as in claim 1 wherein said polyamide resin is selected from the group consisting of polyamide 6 and polyamide 6,6.

12. A composition as in claim 1 which comprises an agent to improve the impact strength.

13. The composition of claim 1, further comprising an additive selected from the group consisting of reinforcing fibers, stabilizers, dyes, pigments, polyolefins, lubricants and mixtures thereof.

14. An article comprising the composition of claim 1.

15. A thermoplastic composition consisting essentially of (a) a compatibilized polyphenylene ether-polyamide base resin, and (b) 1–7 parts by weight per 100 parts by weight of (a) an electroconductive carbon black, wherein the composition has a notched Izod impact strength of more than 15 $kJ/m^2$ (measured in accordance with ISO 180/1A) and a volume resistivity of less than $10^6$ Ohm-cm (measured on the narrow parallel portion of a multipurpose test specimen type A according to ISO 3167 with a length of about 70 mm obtained by breaking off both ends of the test specimen, molded as described in ISO 294 for dumb-bell bars, the fracture surface of both ends being coated with a silver paint and the resistivity being measured between the silver painted surfaces with an electrical multimeter) and wherein said electroconductive carbon black is added into said compatibilized polyphenylene ether-polyamide base resin.

* * * * *